(12) United States Patent
Raynal et al.

(10) Patent No.: US 9,333,480 B2
(45) Date of Patent: May 10, 2016

(54) HIGH-PERFORMANCE STRUCTURED PACKING FOR A FLUID CONTACTING COLUMN

(71) Applicant: IFP Energies nouvelles, Rueil-Malmaison Cedex (FR)

(72) Inventors: Ludovic Raynal, Oullins (FR); Raphael Gonnot, Feyzin (FR); Mickael Mejean, Grigny (FR); Pascal Alix, Roussillon (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 14/426,423

(22) PCT Filed: Aug. 12, 2013

(86) PCT No.: PCT/FR2013/051926
§ 371 (c)(1),
(2) Date: Mar. 6, 2015

(87) PCT Pub. No.: WO2014/041269
PCT Pub. Date: Mar. 20, 2014

(65) Prior Publication Data
US 2015/0238926 A1    Aug. 27, 2015

(30) Foreign Application Priority Data

Sep. 11, 2012    (FR) ...................................... 12 02422

(51) Int. Cl.
*B01J 19/32*    (2006.01)

(52) U.S. Cl.
CPC .......... *B01J 19/32* (2013.01); *B01J 2219/3221* (2013.01); *B01J 2219/32213* (2013.01);

(Continued)

(58) Field of Classification Search
CPC .............. B01J 19/32; B01J 2219/3221; B01J 2219/32213; B01J 2219/32237; B01J 2219/32265; B01J 2219/32248; B01J 2219/32251; B01J 2219/32262; B01J 2219/32241
USPC ....................................................... 261/112.2
See application file for complete search history.

(56) References Cited

U.S. PATENT DOCUMENTS 3,679,537 A    7/1972    Huer et al.
4,296,050 A    10/1981    Meier
(Continued)

FOREIGN PATENT DOCUMENTS

FR    2871074 A1    12/2005

OTHER PUBLICATIONS

International Search Report for International Application No. PCT/FR2013/051926 dated Oct. 4, 2013.

*Primary Examiner* — Charles Bushey
*Assistant Examiner* — Scott Bushey
(74) *Attorney, Agent, or Firm* — Fitch, Even, Tabin and Flannery LLP (57) ABSTRACT

The packing includes a pile of plates having corrugations forming a succession of channels comprising fins, each fin being made up of at least one band cut out in one of the plates and remaining secured to the plate on at least one side, the band being deformed so as to create an orifice forming a discontinuity on the surface of the plate, wherein the direction of the channels of a plate forms a non-zero angle with respect to the direction of the edges of an adjacent plate. Finally, the lengths of the fins of a channel are different from those of the fins of a neighboring channel.

5 Claims, 6 Drawing Sheets

(52) U.S. Cl.
CPC .............. *B01J2219/32237* (2013.01); *B01J 2219/32241* (2013.01); *B01J 2219/32248* (2013.01); *B01J 2219/32251* (2013.01); *B01J 2219/32262* (2013.01); *B01J 2219/32265* (2013.01)

(56) References Cited

U.S. PATENT DOCUMENTS

| | | | | |
|---|---|---|---|---|
| 4,676,934 A | * | 6/1987 | Seah | B01J 19/32 165/60 |
| 4,710,326 A | * | 12/1987 | Seah | B01F 5/0643 261/112.2 |
| 5,063,000 A | * | 11/1991 | Mix | B01J 19/32 261/112.2 |
| 5,407,607 A | * | 4/1995 | Mix | B01F 5/0617 261/112.2 |
| 5,578,254 A | * | 11/1996 | Mix | B01F 5/0617 261/112.2 |
| 5,629,258 A | * | 5/1997 | Suess | B01F 5/0616 202/266 |
| 6,096,407 A | * | 8/2000 | Vodicka | B01J 19/32 261/112.2 |
| 6,266,880 B1 | * | 7/2001 | Lehman | B01D 59/04 29/890.03 |
| 6,409,378 B1 | | 6/2002 | Kessler | |
| 8,646,758 B2 | * | 2/2014 | Raynal | B01J 19/32 261/112.2 |
| 9,186,648 B2 | * | 11/2015 | Wolf | B01J 19/32 |
| 2005/0205467 A1 | * | 9/2005 | Hedrick | C10G 11/18 208/150 |
| 2008/0036102 A1 | * | 2/2008 | Thonnelier | B01J 19/30 261/112.2 |
| 2010/0213625 A1 | | 8/2010 | Raynal et al. | |
| 2015/0231597 A1 | * | 8/2015 | Raynal | B01J 19/32 261/114.5 |

* cited by examiner

HIGH-PERFORMANCE STRUCTURED PACKING FOR A FLUID CONTACTING COLUMN

FIELD OF THE INVENTION

The present invention relates to the sphere of fluid contacting equipments.

The purpose of contacting columns is to provide contact between fluids in order to achieve material or heat transfers between the fluids. This type of fluid contacting equipment is widely used to carry out distillation, rectification, absorption, heat exchange, extraction, chemical reaction operations, etc.

BACKGROUND OF THE INVENTION

Contacting columns generally consist of a cylindrical enclosure provided with internal contacting elements promoting exchange between the fluids. In the column, the fluids can circulate in a cocurrent or a countercurrent flow. In general, the column allows to provide intimate contact between an ascending gas phase and a descending liquid phase. The contacting elements that increase the contact surface between the fluids can be trays, structured packings, i.e. the juxtaposition of several unitary elements arranged in an ordered manner, corrugated sheets for example, or random packings, i.e. anarchic piles of unitary elements, for example rings, spirals.

Structured packings can consist of folded sheets arranged in an organized manner as big blocks, as described for example in documents U.S. Pat. No. 3,679,537 and U.S. Pat. No. 4,296,050. The new generation of random packings generally consists of metal elements provided with perforations and arc portions with sophisticated shapes.

Structured packings afford the advantage of providing a large geometric area for a given representative diameter, generally the hydraulic diameter of the channels, however the effective area is less than or close to the geometric area thereof. A contrario, random packings provide rather low geometric area values in relation to the characteristic size thereof, but they can have effective transfer areas greater than the geometric areas thereof.

Figure 1:
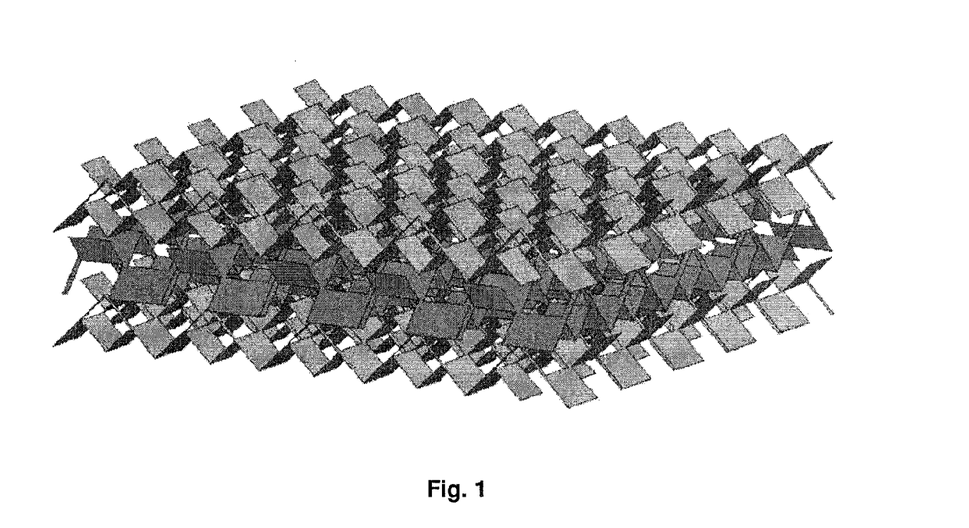
FIG. 1 shows a packing made up of a pile of corrugated plates comprising fins.

Patent application US-2010/0,213,625 describes a packing combining the advantages of structured packings and the advantages of random packings. Such a structured packing is so designed as to exhibit the characteristics of random packings inducing in particular liquid detachment from the surface of the packing and allowing to develop an effective area substantially greater than the geometric area thereof. This packing (FIG. 1) consists of a pile of plates (FIGS. 2, 3A and 3B) comprising corrugations, each plate being inscribed between two parallel planes, the distance between said planes ranging between 5 and 50 mm. The corrugations form a succession of positive (top of a channel, CA2) and negative (hollow of a channel, CA1) edges comprising fins inscribed between said two parallel planes. The fins are formed by cutting and deforming a band B. Notches C1 and C2 are cut out in band B. Notches C1 and C2 form an angle of 90° to the principal direction of the channels. Band B remains secured to the plate at ends E1 and E2. Band B is deformed so as to follow a triangular shape substantially symmetrical to the initial shape thereof, in relation to the meridian plane P. The width L of a band B is approximately equal to the distance between two contiguous bands along a channel (between 1 and 15 mm). Direction (D) of the edges of a plate forms a non-zero angle to the direction (D') of the edges of an adjacent plate. The positions of two consecutive plates are such that the principal directions of the edges of each one of the two plates range from 60° to 90°.

Figure 4:
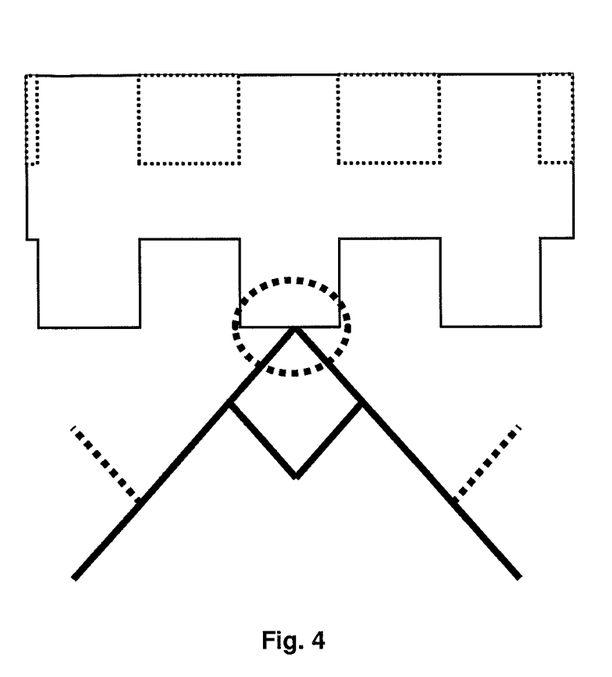
FIG. 4 shows a case of good contact between two consecutive plates.
Figure 5:
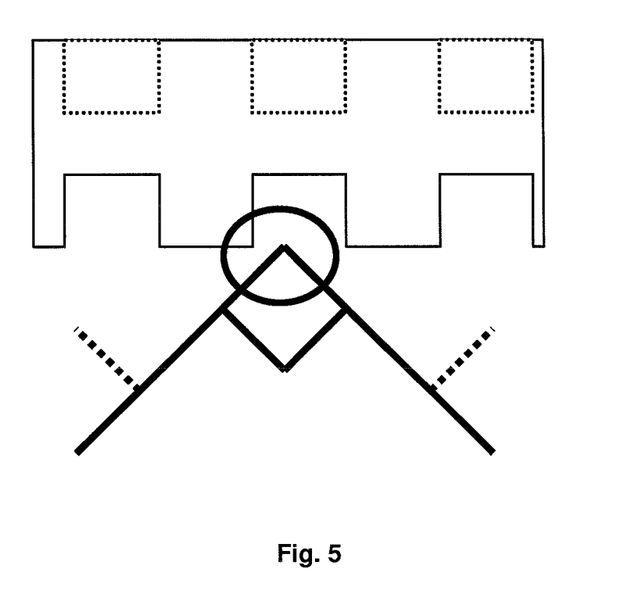
FIG. 5 shows a case of bad contact between two consecutive plates.

FIG. 4 and FIG. 5 respectively show two possible contacts between two consecutive plates. A contact between two plates is referred to as good when it occurs between a positive edge of a plate and a negative edge of an adjacent plate. In FIG. 4, there is a match between two opening-free zones and a good contact between the plates so that there is no interpenetration risk. In FIG. 5, there is a match between, on the one hand, an opening-free zone (lower plate) and, on the other hand, a zone provided with an opening (upper plate); there is thus no good contact between the plates so that they can interpenetrate, therefore no satisfactory setup is possible with an embodiment compatible with an industrial production.

Figure 6:
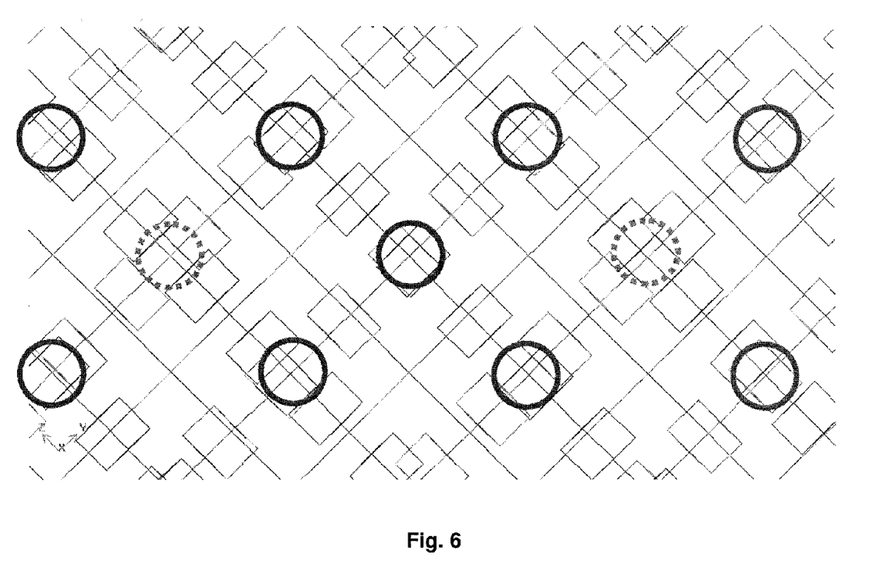
FIG. 6 illustrates the likelihood of bad contacts and good contacts between two consecutive plates.

The likelihood of bad contacts is illustrated in FIG. 6. This figure corresponds to a 2D view of two superimposed plates. It can be noted that, despite some zones with good contacts (circles in dotted line), there is a large number of bad contacts (circles in solid line). When mounting industrial packing blocks, the many plates making up a block are tightly held against one another and not having enough contact points results in failure to respect the total block thickness; there are zones with entangled plates harmful to the flow and other zones with too great a spacing, with possible gas or liquid bypass.

In order to maintain the packing performances, it is essential to provide good mounting of the plates in relation to one another, i.e. tangle-free mounting.

The object of the invention thus relates to a packing combining the advantages of structured packings and the advantages of random packings, such as the packing described in document US-2010/0,213,625, wherein the number of good contacts is maximized by a fin length difference between one channel and the neighbouring channel.

SUMMARY OF THE INVENTION

In general terms, the invention relates to a structured packing of a fluid contacting column defining an exchange surface for at least one liquid phase intended to come into intimate contact with at least one gas phase, said packing consisting of a pile of rectangular plates comprising corrugations, each plate being inscribed between two parallel planes (L1; L2), said corrugations forming a succession of channels comprising fins (A) inscribed between said two parallel planes, each one of said fins consisting of at least one band (B) cut out in one of said plates, width (L) of the band ranging between 1 and 15 mm, the band remaining secured to the plate on at least one side (E1; E2) and the band being deformed so as to create an orifice forming a discontinuity on the surface of the plate, wherein direction (D) of the channels of a plate forms a non-zero angle with respect to direction (D') of the channels of an adjacent plate, and wherein the lengths of the fins of a channel are different from those of the fins of a neighbouring channel.

According to the invention, the length of the fins of a channel can range between 1 and 15 mm, and the length of the fins of a neighbouring channel can be greater, ranging between 2 and 50 mm.

According to one embodiment, all the fins of one channel have the same length.

The invention also relates to a fluid contacting column comprising several blocks with structured packings according to the invention, wherein said direction of the packing channels is oriented at an angle ranging between 10° and 75° with respect to the axis of the column and where the median planes of the structured packing of one of said blocks form an angle ranging between 20° and 90° with respect to the median planes of the adjacent blocks.

The invention furthermore relates to an application of a contacting column according to the invention for gas drying, natural gas deacidizing, fumes decarbonation, Claus tail gas treatment or distillation.

BRIEF DESCRIPTION OF THE FIGURES

Other features and advantages of the invention will be clear from reading the description hereafter, with reference to the accompanying figures wherein.

DETAILED DESCRIPTION

Figure 2:
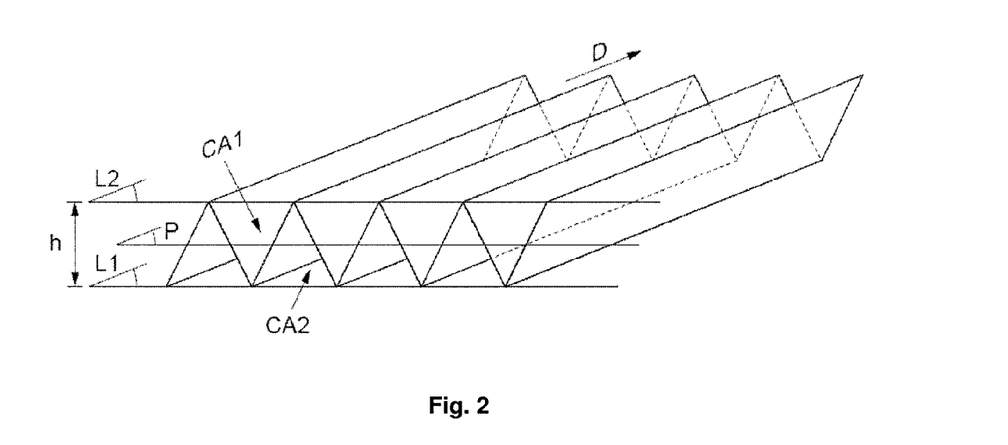
FIG. 2 diagrammatically illustrates a corrugated plate form shown without fins.
Figure 3A:
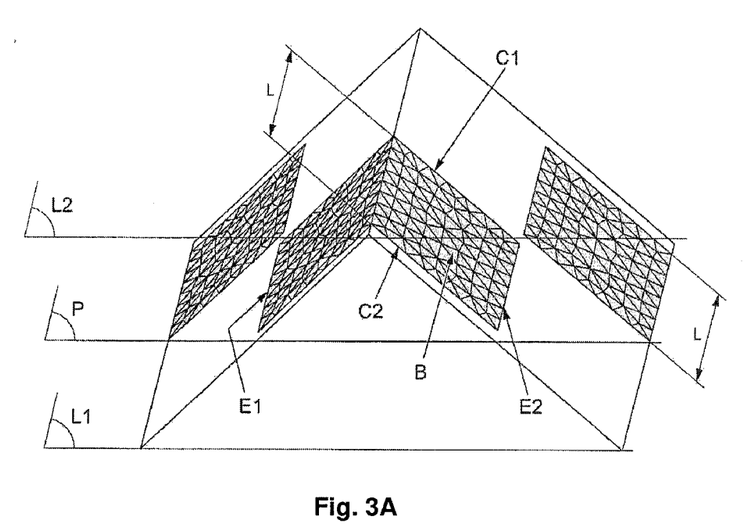
FIGS. 3A and 3B show a band cut out in a channel of a corrugated plate.
Figure 3B:
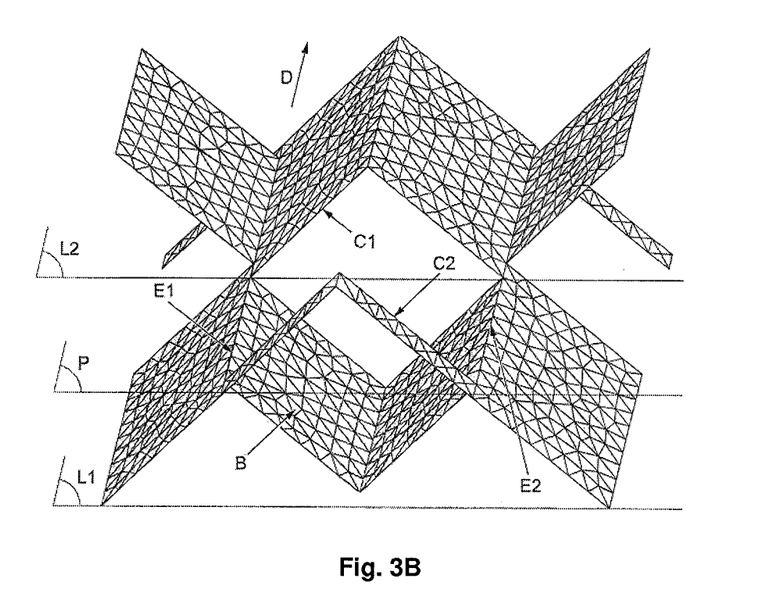

FIGS. 2, 3A and 3B show a rectangular corrugated sheet or plate forming the base of the structured packing according to the invention. The corrugations are bounded by two parallel planes L1 and L2 that are relatively close. Distance h between L1 and L2 can range between 5 mm and 50 mm, it is preferably greater than 10 mm, and it preferably ranges between 10 mm and 30 mm. Meridian plane P divides the space between L1 and L2 into two equal parts. In FIGS. 2, 3A and 3B, the corrugations have a triangular shape and they are distributed on either side of meridian plane P: part of the corrugations is positioned on one side of plane P and the other part is positioned on the other side of plane P. The corrugations form a succession of channels extending in the direction shown by arrow D. In FIG. 2, channel CA1 is positioned beneath plane P. Channel CA2 contiguous to channel CA1 is located above plane P. Corrugations generating channels that touch planes L1 and L2 without exceeding the space delimited by these two planes are preferably selected. Thus, the corrugated sheets occupy a maximum surface area in the plane section defined by planes L1 and L2. A channel comprises either a positive edge (CA2) or a negative edge (CA1).

Various plate corrugation shapes can be used for a structured packing according to the invention. For example, sinusoidally corrugated plates can be employed. It is also possible to use corrugations that are not symmetrical, for example a sequence of semi-circles and triangles. Plates comprising irregular and random corrugations can also be utilized.

The corrugations that form a succession of positive (top of a channel) and negative (hollow of a channel) edges comprise fins inscribed between the two parallel planes. Each fin consists of at least one band cut out in one of the plates, the width of the band ranging between 1 mm and 15 mm, the band remaining secured to the plate on at least one side and the band being deformed so as to create an orifice forming a discontinuity on the surface of the plate. Direction (D) of the edges of a plate forms a non-zero angle with respect to direction (D') of the edges of an adjacent plate.

The positions of two consecutive plates are such that the principal directions of the edges of each one of the two plates range between 60° and 90°.

In order to improve the performances of this type of packing, it is essential to provide good mounting of the plates, i.e. without them being entangled. The plates are therefore modified so as to maximize the number of good contacts between two plates, i.e. contacts occurring between a positive edge of a plate and a negative edge of an adjacent plate.

Figure 7:
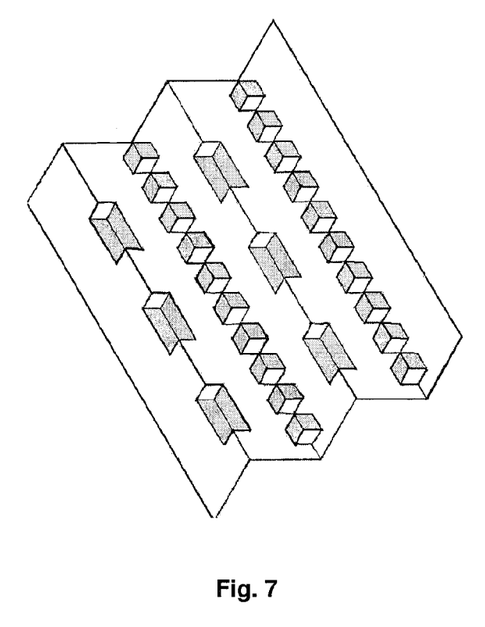
FIG. 7 illustrates a 3D view of a packing plate according to the invention.
Figure 8:
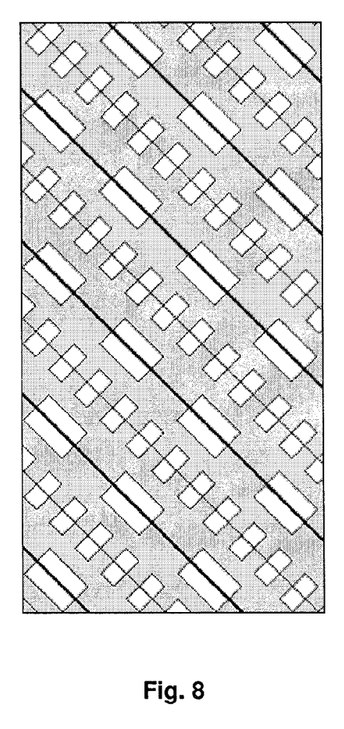
FIG. 8 shows a top view of a plate according to the invention, with long openings on the tops (positive edges in thick line) and short openings in the hollows (negative edges in thin line)

According to the invention, the lengths of the fins of a channel are different from those of the fins of a neighbouring channel, as illustrated in FIG. 7 and FIG. 8.

For example, large openings can be used on the positive edges, and small openings on the negative edges.

The length of the small openings ranges between 1 and 15 mm, preferably between 2 and 10 mm.

The length of the large openings ranges between 2 and 50 mm, preferably between 5 and 25 mm.

The characteristics of the channel are such that 50 to 800 $m^2/m^3$, preferably 150 to 500 $m^2/m^3$ geometric area are developed.

FIG. 7 shows a 3D view of a packing plate according to the invention.

FIG. 8 is a top view of a plate according to the invention, with long openings on the tops (positive edges) and short openings in the hollows (negative edges).

Figure 9:
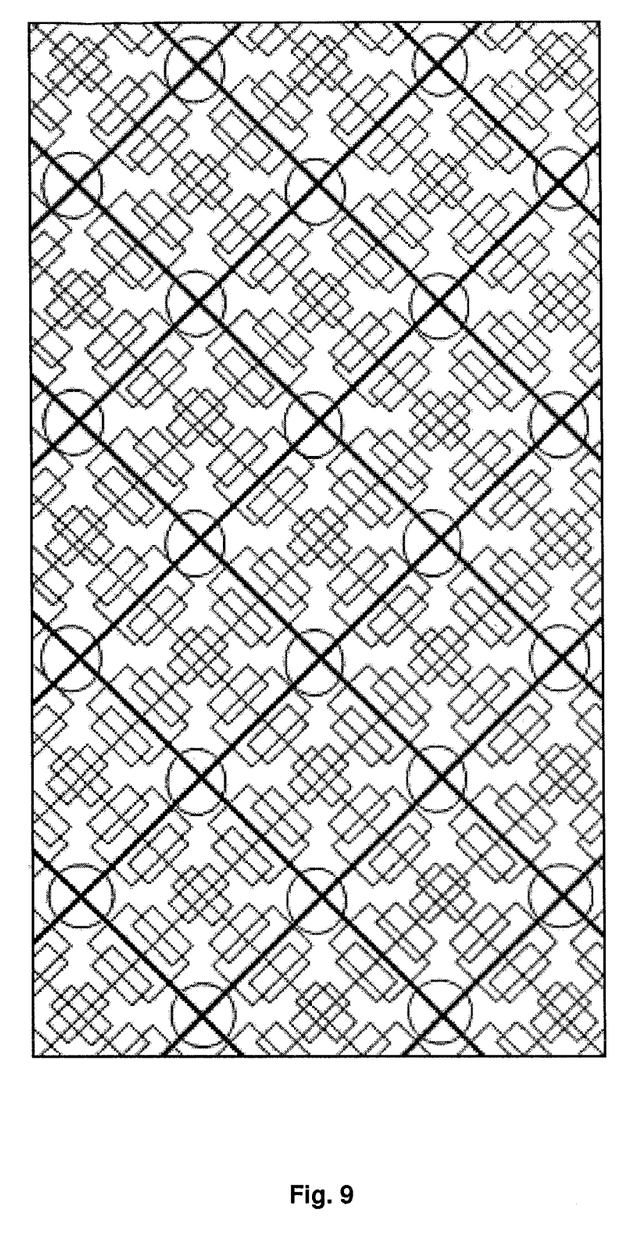
FIG. 9 shows a top view of two packing plates according to the invention, one above the other, with good contacts highlighted (zones surrounded by circles).

FIG. 9 is a top view of two packing plates according to the invention, one above the other (only the lower openings of the upper plate and only the upper openings of the lower plate are shown). The circles show the points with good contact (contact between a positive edge of a plate and a negative edge of an adjacent plate).

The corrugated sheets provided with fins are piled so as to form a structured packing. Preferably, the direction of the channels of a corrugated sheet is offset in relation to the direction of the channels of the adjacent sheets, for example by an angle ranging between 20° and 90°, and preferably an angle having a value substantially close to 90°.

For a corrugated plate of height H and length L, height H is the height of the packing blocks, it is generally close to 20 cm but it can range between 2 cm and 1 m, preferably between 10 cm and 30 cm. Length L is variable and it depends on the diameter of the column containing the packing, this diameter typically ranging from 5 cm to 15 m. For conventional industrial columns, i.e. with a diameter above 1 m, the lengths preferably range between 0.5 and 3 m, more preferably between 1 and 2 m.

The packing according to the invention can be used for gas drying, natural gas deacidizing, fumes decarbonation and Claus tail gas treatment.

In these applications, the gas to be treated is contacted with a liquid absorbent solution in a contacting column. This column comprises several blocks containing structured packings according to the invention, wherein the direction of the channels of the packings is oriented at an angle ranging between 10° and 75° with respect to the axis of the column and wherein the median planes of the structured packing of one of said blocks form an angle ranging between 20° and 90° with respect to the median planes of the adjacent blocks.

The packing according to the invention can be used for distillation, notably hydrocarbon cuts distillation. In this application, the packing according to the invention is arranged in a column provided with at least one feed line and two withdrawal lines for a heavy phase and a light phase.

The invention claimed is:

1. A structured packing of a fluid contacting column defining an exchange surface for at least one liquid phase intended to come into intimate contact with at least one gas phase, said packing consisting of a pile of rectangular plates comprising corrugations, each plate being inscribed between two parallel planes, said corrugations forming a succession of channels comprising fins inscribed between said two parallel planes, each one of said fins consisting of at least one band cut out in one of said plates, width of the band ranging between 1 and 15 mm, the band remaining secured to the plate on at least one side and the band being deformed so as to create an orifice forming a discontinuity on the surface of the plate, wherein direction of the channels of a plate forms a non-zero angle with respect to direction of the channels of an adjacent plate, and wherein the lengths of the fins of a channel are different from the lengths of the fins of a neighbouring channel.

2. A packing as claimed in claim 1, wherein the length of the fins of a channel ranges between 1 and 15 mm, and the length of the fins of a neighbouring channel is greater, ranging between 2 and 50 mm.

3. A packing as claimed in claim 1, wherein all the fins of one channel have the same length.

4. A fluid contacting column comprising several blocks with structured packings as claimed in claim 1, wherein said direction of the packing channels is oriented at an angle ranging between 10° and 75° with respect to the axis of the column and where the median planes of the structured packing of one of said blocks form an angle ranging between 20° and 90° with respect to the median planes of the adjacent blocks.

5. Application of a contacting column as claimed in claim 4 for gas drying, natural gas deacidizing, fumes decarbonation, Claus tail gas treatment or distillation.

* * * * *